United States Patent
Brueckner et al.

(10) Patent No.: US 7,191,081 B2
(45) Date of Patent: Mar. 13, 2007

(54) METHOD FOR CORRECTING AN OSCILLATOR FREQUENCY

(75) Inventors: Joerg Brueckner, Sindelfingen (DE); Manfred Strohrmann, Karlsruhe (DE); Hans Loistl, Cleebronn (DE); Axel-Werner Haag, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/487,117

(22) PCT Filed: Aug. 16, 2002

(86) PCT No.: PCT/DE02/03035

§ 371 (c)(1),
(2), (4) Date: Jun. 15, 2004

(87) PCT Pub. No.: WO03/016828

PCT Pub. Date: Feb. 27, 2003

(65) Prior Publication Data

US 2004/0232905 A1    Nov. 25, 2004

(30) Foreign Application Priority Data

Aug. 18, 2001  (DE) ............................... 101 40 618

(51) Int. Cl.
   *G01R 23/00*    (2006.01)

(52) U.S. Cl. .......................................... 702/75; 701/214

(58) Field of Classification Search ............ 702/33–34, 702/66, 69, 71, 75, 104–106, 182–183, 185; 701/1, 36–37, 214

See application file for complete search history.

(56) References Cited

U.S. PATENT DOCUMENTS

| | | | |
|---|---|---|---|
| 4,616,173 A | 10/1986 | Cook et al. | 324/76.62 |
| 4,906,944 A * | 3/1990 | Frerking | 331/1 A |
| 5,041,800 A * | 8/1991 | Long et al. | 331/69 |
| 5,402,394 A | 3/1995 | Turski | 368/10 |
| 5,493,710 A * | 2/1996 | Takahara et al. | 455/192.2 |
| 6,161,003 A * | 12/2000 | Lo Curto et al. | 455/260 |
| 6,342,845 B1 * | 1/2002 | Hilliard et al. | 340/941 |
| 6,414,909 B1 * | 7/2002 | Shimizu et al. | 368/204 |
| 6,590,376 B1 * | 7/2003 | Bammert et al. | 324/76.41 |
| 6,625,522 B2 * | 9/2003 | Sakurai et al. | 701/1 |
| 6,747,374 B2 * | 6/2004 | Kouzuma | 307/106 |
| 2001/0026180 A1 * | 10/2001 | Aoki et al. | 327/162 |

FOREIGN PATENT DOCUMENTS

| | | |
|---|---|---|
| DE | 197 22 114 | 4/2003 |
| EP | 0 288 601 | 11/1988 |

* cited by examiner

*Primary Examiner*—Marc S. Hoff
*Assistant Examiner*—Mary Catherine Baran
(74) *Attorney, Agent, or Firm*—Kenyon & Kenyon LLP

(57) ABSTRACT

A method for correcting an oscillator frequency of in particular a digital transmitter/receiver interface for transmitting measurement signals of a sensor to a control unit. The method includes outputting of a first reference frequency signal by the sensor, the first reference frequency signal and comparing it with a second reference frequency signal by the control unit, calculating a correction factor on the basis of the first and second reference frequency signals, and correcting the frequency signals representing actual measured quantities subsequently sent by the sensor and received by the control unit based on the calculated correction factor to obtain corrected frequency signals.

11 Claims, 2 Drawing Sheets

METHOD FOR CORRECTING AN OSCILLATOR FREQUENCY

FIELD OF THE INVENTION

The present invention relates to a method and a device for correcting oscillator frequencies. Although applicable in principle to any networks, the present invention and the problems on which it is based are explained here on the basis of automotive control units which are interconnected, for example, via a CAN system having a serial bus structure.

BACKGROUND INFORMATION

The processors used in such control units, e.g., engine control units, pump control units, brake control units, etc., are usually supplied with an external clock signal of an oscillator in the form of a quartz oscillator. The accuracy with which its clock frequency is adjustable has a direct influence on the computing accuracy of the respective processor. A device for supplying a clock signal for the processor of a control unit is described in German Patent Application No. DE 197 22 114, for example.

In the frequency interface transmission of measured values from a sensor to a control unit, the information regarding a measured quantity to be transmitted is contained in the period of the digital signals transmitted. Tolerance investigations here have shown that the oscillators which act for the sensor, which is used as the transmitter, and the control unit, which is used as the receiver, are to be taken into account in adjusting and/or estimating the system tolerance. For this reason, attempts have been made to use oscillators having a high precision, which has traditionally resulted in the use of quartz oscillators.

However, the use of quartz oscillators is associated with high costs, so an attempt is made as part of the present invention to avoid, if possible, the cost-intensive use of quartz oscillators in conjunction with the applications indicated above.

SUMMARY

According to the present invention, it is now possible to minimize the use of quartz oscillators. This makes it possible to substantially reduce the cost of providing sensors or control units, because according to the present invention there is no need to provide quartz oscillators on the sensor end and on the control unit end in order to achieve results of sufficient accuracy.

According to a preferred embodiment of the present invention, a setpoint frequency signal is generated on the receiver end as a second reference frequency signal $f_{ref,\ setpoint}$ by using a quartz oscillator in particular. By providing a quartz oscillator on the control unit end, it is possible to use RC circuits, which have a very simple design and are available inexpensively, as oscillators on the sensor end, because any inaccuracies, i.e., tolerances, may be compensated optimally by a corrective computation using the quartz oscillator frequency. It is thus possible according to the present invention to use a reference frequency signal $f_{ref,\ actual}$ which is subject to a tolerance and is supplied by the RC circuit for compensation of the oscillators in a simple form. It should be pointed out that it is also conceivable to provide on the sensor end a quartz oscillator to generate a setpoint frequency signal, which is then transmitted to the receiver, where it is compensated with a frequency signal there. This would make it possible to eliminate the use of a quartz oscillator on the receiver end. It is also possible to eliminate quartz oscillators on both the sensor end and the control unit end, a higher accuracy also being achievable in this case in comparison with a traditional method for supplying RC oscillating circuits on the sensor end and on the receiver end because the particular RC oscillating circuits may be compensated with respect to one another.

It is preferable for the correction factor which is calculated in the method according to the present invention to be calculated using an equation of the form:

$$K_{cor} = f_{ref,\ setpoint} / f_{ref,\ actual}.$$

Such a correction factor is very easily generated by computer and yields corrections of sufficient accuracy.

Such a correction factor is very easily generated by computer and yields corrections of sufficient accuracy.

It should be pointed out here that there are, for example, two possibilities for transmitting $f_{ref,\ actual}$ to the receiver: first, it is possible to interleave $f_{ref,\ actual}$ in time with the useful signal, e.g., in the power-on state in the case of a single-wire line. It is also possible for a second signal to permanently make information $f_{ref,\ actual}$ available, e.g., in the form of the period or pulse duration of the second signal, if they are constant, in the case of a two-wire line.

In a power-on reset of the transmitter, the first reference frequency signal is expediently output and transmitted to the receiver. This ensures that an unhindered analysis of the actual information-carrying signals may be performed following the determination of the correction factor on the basis of this first reference frequency signal and the second reference frequency signal. For the sake of thoroughness, it should be pointed out that it is not absolutely necessary to output $f_{ref,\ actual}$ in a power-on reset.

This output could also be performed cyclically, for example, when a change in oscillator frequency is also to be corrected during instantaneous operation, e.g., because of the response to temperature changes.

It may also be advantageous if the output of the first reference frequency signal is performed cyclically, in particular at regular periodic intervals. With this measure, corrections that may become necessary during operation of the system could be performed, e.g., on the basis of a response to temperature changes.

In a preferred embodiment of the method according to the present invention and/or the device according to the present invention, the frequency signals, i.e., useful signals, and the reference frequency signals are transmitted from the sensor to the control unit over a single-wire line. Such a measure makes is possible to keep the hardware complexity relatively low.

According to another preferred embodiment of the method and/or device according to the present invention, the frequency signals, i.e., useful signals, and the reference frequency signals are each transmitted from the sensor to the control unit over different lines of a two-wire line. It is possible with this measure to transmit reference frequency signals generally independently of the actual useful signals. This procedure has proven expedient in particular when there should be a periodic check, i.e., adjustment of the correction to be performed according to the present invention.

BRIEF DESCRIPTION OF THE DRAWINGS

The present invention is explained in greater detail below on the basis of the example embodiments illustrated in the Figures.

DETAILED DESCRIPTION

Figure 1:
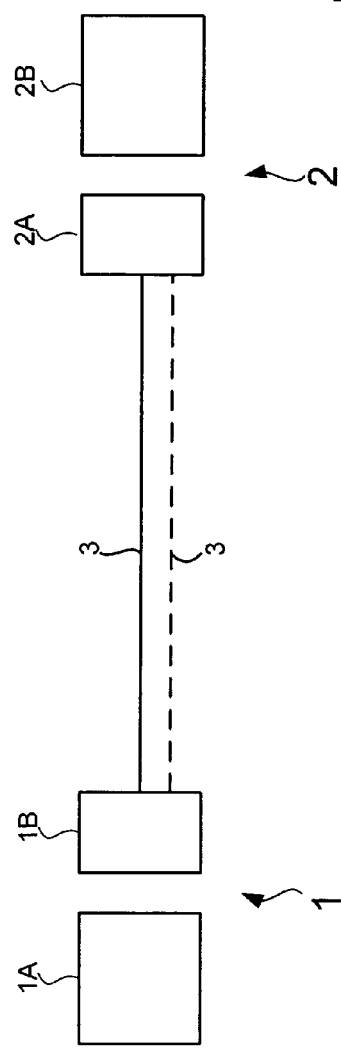
FIG. 1 shows a schematic block diagram to illustrate a preferred embodiment of the device according to the present invention.

FIG. 1 shows schematically a sensor 1 and a control unit 2. Sensor 1 has an actual sensor element 1a and control unit 2 has an actual computation device 2a. Sensor element 1a has an AD converter (not shown) for converting measured quantities into digital measurement signals. A frequency interface is provided for transmission of measured data from sensor 1 to control unit 2, the information about a measured value to be transmitted being contained in the period of the digital signal to be transmitted. Measured data is transmitted over line 3, which may be either hard wired or wireless.

On the sensor end, the interface has a transmitter 1b, and on the control unit end, it has a receiver 2b. Sensor 1 and control unit 2 are each designed with an oscillator device (not shown). In the exemplary embodiment shown here, it shall be assumed that an RC circuit is provided as the oscillator device on the sensor end, and a quartz oscillator is provided as the oscillator device on the control unit end.

For compensation of tolerances which may occur with the oscillator on the sensor end, transmitter 1b is capable of outputting a reference frequency signal $f_{ref,\,actual}$ for a defined period of time in a power-on reset. Such a signal will fluctuate, for example, because of drift influences of the oscillator over its lifetime.

This reference frequency signal $f_{ref,\,actual}$ is received by receiver 2b on the receiver end and is compared with a setpoint value $f_{ref,\,setpoint}$ in computation device 2a. Due to the use of a quartz oscillator as the oscillator device in computation device 2a, frequency setpoint value $f_{ref,\,setpoint}$ has a very small tolerance. By forming a quotient of these two signals, a correction factor is determined according to the following equation:

$$K_{cor} = f_{ref,\,setpoint} / f_{ref,\,actual}.$$

Frequencies $f_{actual}$ representing the actual measured quantities of sensor 1a transmitted following transmission of frequency reference signal $f_{ref,\,actual}$ may now be corrected by using the correction factor thus determined. For example, a corrected frequency $f_{cor}$ may be calculated by using an equation of the following form:

$$f_{cor} = f_{actual} * K_{cor}.$$

Since reference frequency signal $f_{ref,\,actual}$ and frequency value $f_{actual}$ of an actual sensor signal are both proportional to the internal oscillator frequency of the sensor, i.e., transmitter, oscillator drift over its lifetime is compensated by this type of analysis, i.e., compensation.

This statement is true in particular for the case when unique correction values are determined, e.g., when $f_{ref,\,actual}$ is transmitted only in a power-on reset. For the case when $f_{ref,\,actual}$ is transmitted cyclically, i.e., regularly, it has also proven expedient to compensate for effects such as a response to temperature changes.

When signal $f_{cor}$ is used in further signal processing, a much more accurate analysis of measured values of sensor 1 is possible.

Figure 2:
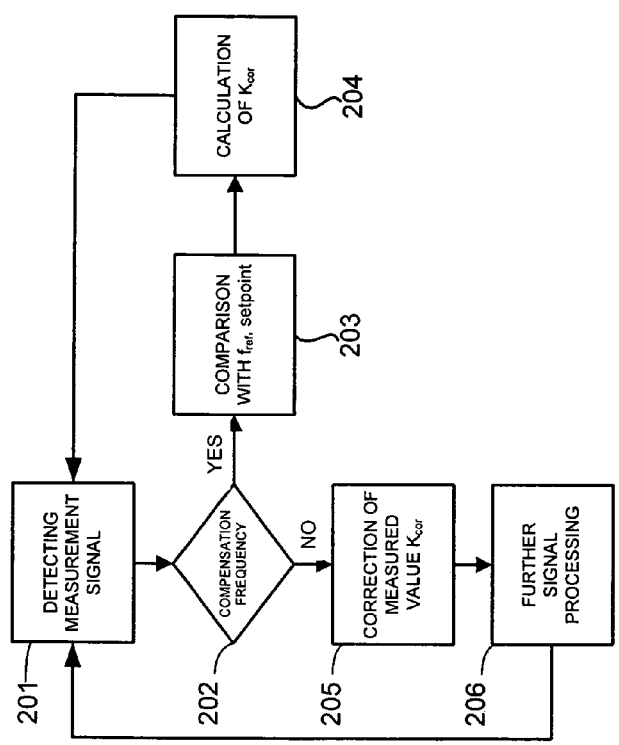
FIG. 2 shows a flow chart to illustrate a first preferred embodiment of the method according to the present invention.

The sequence of a preferred embodiment of the method according to the present invention will now be explained further on the basis of FIG. 2.

First a signal of sensor 1 is detected in a step 201.

A step 202 determines whether or not this signal is a reference frequency signal $f_{ref,\,actual}$. This may be determined by whether or not a power-on reset is detected, for example. If the signal is recognized as reference frequency signal $f_{ref,\,actual}$, the method branches off to a step 203, where a comparison with frequency setpoint $f_{ref,\,setpoint}$ is performed. In a subsequent step 204, a correction factor $K_{cor}$ is calculated, for example, by forming a quotient $f_{ref,\,setpoint}/f_{ref,\,actual}$. This method then branches off back to step 201. If it is found in detection of another measurement signal (step 201) in step 202 that this is not the reference signal but instead an actual measurement signal of sensor 1, then the method branches off to a step 205, in which this measured value $f_{actual}$ is corrected using correction factor $K_{cor}$ calculated in step 204 to obtain a corrected frequency value $f_{cor}$.

Further signal processing is then performed on the basis of corrected frequency value $f_{cor}$ as indicated by step 206. On obtaining another measurement signal from sensor 1, the method depicted here branches back to step 201.

For the sake of thoroughness, the alternative possibility for transmission of $f_{ref,\,actual}$ over a second line as part of a two-wire line will be explained below. It shall be assumed below as an example that, as already mentioned above, information $f_{ref,\,actual}$ is contained in the period of the second signal. In other words, if the sensor has a second data line for transmission of a second sensor parameter, then this second signal may be converted to a digital signal form having a constant period, e.g., in the form of a sampling ratio. Such a second signal having a constant period represents a direct correlation with the internal oscillator frequency within the sensor. For this reason, the period of this signal may also be used as $f_{ref,\,actual}$. With this type of transmission of $f_{ref,\,actual}$, the reference signal is continuously present at each point in time, so the $K_{cor}$ value may be determined at any point in time.

The second data line for transmission of a second sensor parameter is shown with dotted lines in FIG. 1 and is labeled as 3'.

Figure 3:
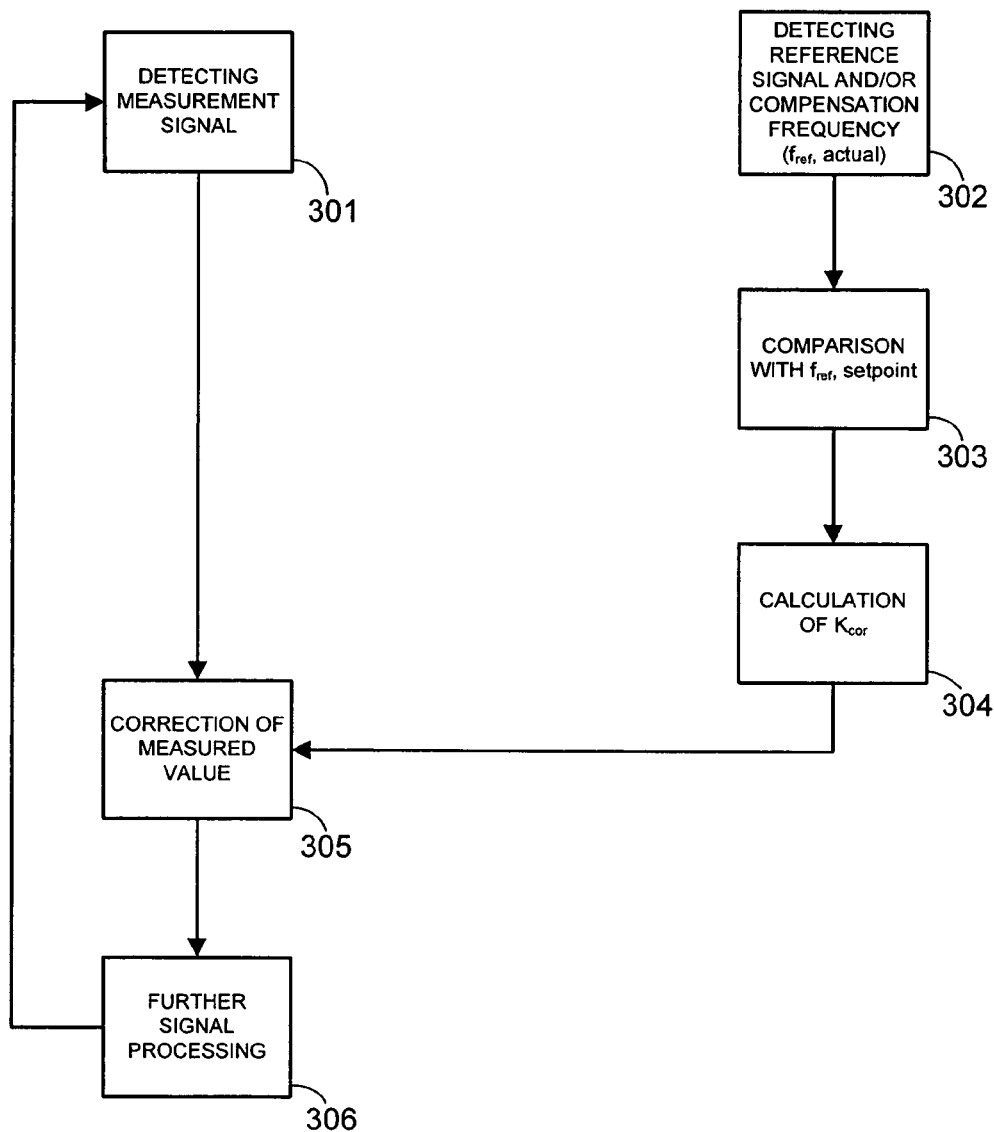
FIG. 3 shows a flow chart to illustrate a second preferred embodiment of the method according to the present invention.

FIG. 3 shows the sequence of a preferred embodiment of the method according to the present invention, in particular using a two-wire line. First a signal of sensor 1 is detected in a step 301. In parallel with this, a reference frequency signal $f_{ref,\,actual}$ is detected on the sensor end in a step 302. This reference frequency signal may be, for example, a modified signal with respect to a second sensor parameter, as explained above. In a subsequent step 303, this signal $f_{ref,\,actual}$ is compared with a frequency setpoint $f_{ref,\,setpoint}$ in computation device 2a in particular. On the basis of the comparison performed in step 303, a correction factor $K_{cor}$ is again calculated, e.g., by forming a quotient $f_{ref,\,setpoint}/f_{ref,\,actual}$ (step 304).

The measurement signal of the sensor detected in step 301 is then corrected with correction factor $K_{cor}$ in step 305 to obtain a corrected frequency value $f_{cor}$.

By analogy with the method described with reference to FIG. 2, further signal processing then takes place on the basis of corrected frequency value $f_{cor}$ as indicated by step 306. On receiving another measurement signal of the sensor, the method branches off back to step 301.

The method described last may be particularly suitable when a two-wire line is available for transmitting measurement signals, i.e., useful signals, over a first line and information $f_{ref,\,actual}$ over a second line from the sensor to the control unit. This method is applicable in particular when a cyclic, i.e., periodic, output of $f_{ref, actual}$ is intended. This makes it possible, for example, to detect a change in the oscillator frequency of the sensor during operation, e.g., on the basis of a response to temperature changes, and to correct it. For the sake of thoroughness, it should be pointed out that cyclic transmission of a reference signal is also possible when using a single-wire line for transmission of measurement signals and reference signals. To do so, reference frequency signal $f_{ref, actual}$ is expediently interleaved in time with the useful signal.

What is claimed is:

1. A method for correcting an oscillator frequency of a digital transmitter/receiver interface for transmitting measurement signals of a sensor to a control unit, comprising:
   outputting a first reference frequency signal by the sensor;
   receiving by the control unit the first reference frequency signal, and comparing by the control unit the first reference frequency signal with a second reference frequency signal generated by the control unit;
   calculating a correction factor on a basis of the first reference frequency signal and the second reference frequency signal, wherein the correction factor is determined by forming a quotient of the first reference frequency signal and the second reference frequency signal; and
   correcting actual signals, which represent actual measured quantities, subsequently sent by the sensor and received by the control unit based on the calculated correction factor to yield corrected frequency signals.

2. The method as recited in claim 1, further comprising:
   generating a setpoint frequency signal one of on a control unit end, or on a receiver end by using a quartz oscillator.

3. The method as recited in claim 1, wherein the outputting of the first reference frequency signal, and the calculating of the correction factor are performed during a power-on reset before sending frequency signals which represent actual measured values.

4. The method as recited in claim 1, wherein the outputting of the first reference frequency signal is carried out cyclically at periodic periodic intervals.

5. The method as recited in claim 1, wherein the actual frequency signals, the first reference frequency signal, and the second reference frequency signal are transmitted from the sensor to the control unit over a single-wire line.

6. The method as recited in claim 1, wherein the actual frequency signals, and the first and second reference frequency signals are each transmitted from the sensor to the control unit over different lines of a two-wire line.

7. A method for correcting an oscillator frequency of a digital transmitter/receiver interface for transmitting measurement signals of a sensor to a control unit, comprising:
   outputting a first reference frequency signal by the sensor;
   receiving by the control unit the first reference frequency signal, and comparing by the control unit the first reference frequency signal with a second reference frequency signal generated by the control unit;
   calculating a correction factor on a basis of the first reference frequency signal and the second reference frequency signal; and
   correcting actual signals, which represent actual measured quantities, subsequently sent by the sensor and received by the control unit based on the calculated correction factor to yield corrected frequency signals
   wherein the correction factor is calculated according to an equation of the form $$K_{cor} = f_{ref, setpoint} / f_{ref, actual}$$

where $K_{cor}$ is the correction factor, $f_{ref, setpoint}$ is the second reference frequency signal, and $f_{ref, actual}$ is the first reference frequency signal.

8. A device for correcting an oscillator frequency of a digital transmitter/receiver interface for transmitting measurement signals of a sensor to a control unit, comprising:
   a first arrangement configured to output a first reference frequency signal by the sensor;
   a second arrangement configured to receive the reference frequency signal and to compare the first reference frequency signal with a second reference frequency signal generated by the control unit;
   a third arrangement configured to calculate a correction factor for measurement signals on a basis of the first and second reference frequency signals, wherein the correction factor is determined by forming a quotient of the first reference frequency signal and the second reference frequency signal; and
   a fourth arrangement configured to correct other frequency signals based on the calculated correction factor.

9. The device as recited in claim 8, wherein the second arrangement includes a quartz oscillator.

10. The device as recited in claim 8, further comprising:
    a single-wire line for transmitting the first and second reference frequency signals and the measurement signals from the sensor to the control unit.

11. The device as recited in claim 8, further comprising:
    a two-wire line for transmitting the first and second reference frequency signals over a first line of the two-wire line and the measurement signals over a second line of the two-wire line.

* * * * *